United States Patent [19]

Brumm et al.

[11] Patent Number: 4,820,365

[45] Date of Patent: Apr. 11, 1989

[54] GLASS EDGE SEALANT CURING SYSTEM

[75] Inventors: Curtis Brumm, Mason City, Iowa; Randi Ernst, Lorreto; Lyle H. Rogalla, Hugo, both of Minn.

[73] Assignee: Dimension Industries, Inc., Maple Grove, Minn.

[21] Appl. No.: 102,626

[22] Filed: Sep. 30, 1987

[51] Int. Cl.[4] .............................................. C03C 27/10

[52] U.S. Cl. ...................................... 156/109; 156/64; 156/107; 156/244.22; 156/275.3; 156/292; 156/359; 156/380.9; 156/499; 219/350; 219/358

[58] Field of Search ............ 156/64, 107, 109, 244.22, 156/275.3, 292, 359, 380.9, 499; 219/350, 358

[56] References Cited

U.S. PATENT DOCUMENTS

| | | | |
|---|---|---|---|
| 4,088,522 | 5/1978 | Mercier et al. | 156/107 |
| 4,110,148 | 8/1978 | Rocholl | 156/109 X |
| 4,145,237 | 3/1979 | Mercier et al. | 156/107 |
| 4,391,663 | 7/1983 | Hutter | 156/109 X |
| 4,506,125 | 3/1985 | Smets et al. | 156/109 X |

FOREIGN PATENT DOCUMENTS

| | | | |
|---|---|---|---|
| 61183 | 9/1982 | European Pat. Off. | 156/380.9 |
| 2031982 | 4/1980 | United Kingdom | 156/107 |

*Primary Examiner*—Robert A. Dawson
*Attorney, Agent, or Firm*—Hugh D. Jaeger

[57] ABSTRACT

Glass edge sealant curing system including a method and apparatus for curing edge sealant around a stack of Thermopane windows. Infrared heating units abut three sides of the edges of a stack of Thermopanes on a conveyor. One of the infrared heating units moves in a path perpendicular to the conveyor travel, traveling in and out towards one of the edges of the glass. Once the three edges have been cured, the infrared heating unit across the conveyor raises up to allow the stack of panes to pass underneath and subsequently moves back into position for heating of the trailing edge of the stack of Thermopanes. The heaters are controlled according to one or more algorithms providing for appropriate energy consumption. Optical sensors are provided for determining the height of a stack of Thermopanes, as well as the length and width for appropriate heater energization, and thermopiles are provided for sensing the appropriate curing. A programmed microprocessor controls the entire apparatus, including the conveying of the panes, the movement and the energization of the heater units, and subsequent discharging of the stack of Thermopanes.

10 Claims, 9 Drawing Sheets

GLASS EDGE SEALANT CURING SYSTEM

BACKGROUND OF THE INVENTION

1. Field of the Invention

The present invention pertains to a glass edge sealant curing system, and more particularly, pertains to a method and apparatus for curing edge sealant around stacks of Thermopane windows.

2. Description of the Prior Art

Prior art insulating glass sealant technology has been based upon a large system for curing edge sealant which usually is dedicated to a single size of glass panes. The prior art systems usually have required a right angle conveyor transfer of the panes which is an inefficient utilization of space. Further, the prior art systems usually did not provide for heating of different sized panels of glass.

U.S. Pat. No. 4,391,663, entitled "Method of Curing Adhesive", is representative of the prior art, particularly FIG. 5 which shows a line of transfer at two 90° angles. This is inefficient and time consuming.

The present invention overcomes the disadvantages of the prior art by providing a glass edge sealant curing system where all operations take place on a single conveyor line.

SUMMARY OF THE INVENTION

The general purpose of the present invention is to provide a method and apparatus for glass edge sealant curing system. The high-speed system requires minimal floor space and is microprocessor controlled to provide variable cycle curing times for various edge sealants. The system is fully computer automated, providing efficient straight flow throughput of stacks of Thermopanes.

According to one embodiment of the present invention, there is provided a conveyor for conveying a stack of a plurality of Thermopanes which have been coated with edge sealant, a heater assembly with infrared heating units back to back at a mid-point on the conveyor, a side non-adjustable heater assembly and another side adjustable heater assembly which moves perpendicular to the conveyor path. The back-to-back heater assembly raises and lowers to allow for a stack of a plurality of Thermopanes to pass underneath for subsequent heating of the trailing edges. Thermopiles in the heating assemblies of infrared heaters provide for monitoring the surface of the sealant during curing, providing for proportional, integral and derivative temperature control. The actual temperature of the sealant is measured in real time with optical temperature sensors.

Significant aspects and features of the present invention include an efficient straight flow of stacks of Thermopanes. The edge sealant is cured with long wave infrared energy at high intensity while monitoring with an optical temperature sensor, providing for real time processing of the information and control of the infrared heaters. The temperature control circuit is closed loop with appropriate feedback. The heating panels can be zone controlled for the appropriate temperature control. Cycle times of the infrared heaters can be controlled through algorithms.

Other significant aspects and features of the present invention include flat-plane infrared generators where all the rays are perpendicular to the sealant. High speed stack processing with a 3 to 5 minute resonance time. Fully automatic or manual operation where there is complete flexibility of control and processing systems to match manufacturing environment. The system accepts stacks from 4 to 20 inches in height and ranging from 10"×10" through 92"×60". There is proportional, integral and derivative temperature control of ambient thru 160° F. There is sophisticated optical sensing of sealant temperature. The heating system is 0 to 108 Kilowatt output for quick rise to set temperature so maximum dwell at set point is achieved.

Further significant aspect and features include an automatic energy saving mode, a system that only requires 144 square feet of floor space; and straight inline processing for automatic indexing of stacks.

Having thus described the embodiments of the present invention, it is the principal object hereof to provide a method and apparatus for curing of window edge sealant.

One object of the present invention includes providing for mechanical operation, temperature control and system operation with a straight flow conveyor system.

Another object of the present invention is that the entire operation can be controlled by a microprocessor, such as a personal computer, with minimal operation intervention.

A further object of the present invention is to provide a system which accepts an appropriate control algorithm, dependent on the window size and sealant chemistry to automatically program the computer to control the system for a specific sealant, making the system adaptable to any application.

Still another important object of the present invention is that the system provides for heating of any size of stacks of panes, and the stacks of panes can be intermixed on the conveyor assembly as the conveyors adjust to the sizes and turn on infrared heaters only in response to the sensing of the dimensions of a stack of Thermopanes.

BRIEF DESCRIPTION OF THE DRAWINGS

Other objects of the present invention and many of the attendant advantages of the present invention will be readily appreciated as the same becomes better understood by reference to the following detailed description when considered in connection with the accompanying drawings, in which like reference numerals designate like parts throughout the figures thereof and wherein.

DESCRIPTION OF THE PREFERRED EMBODIMENTS

Figure 1:
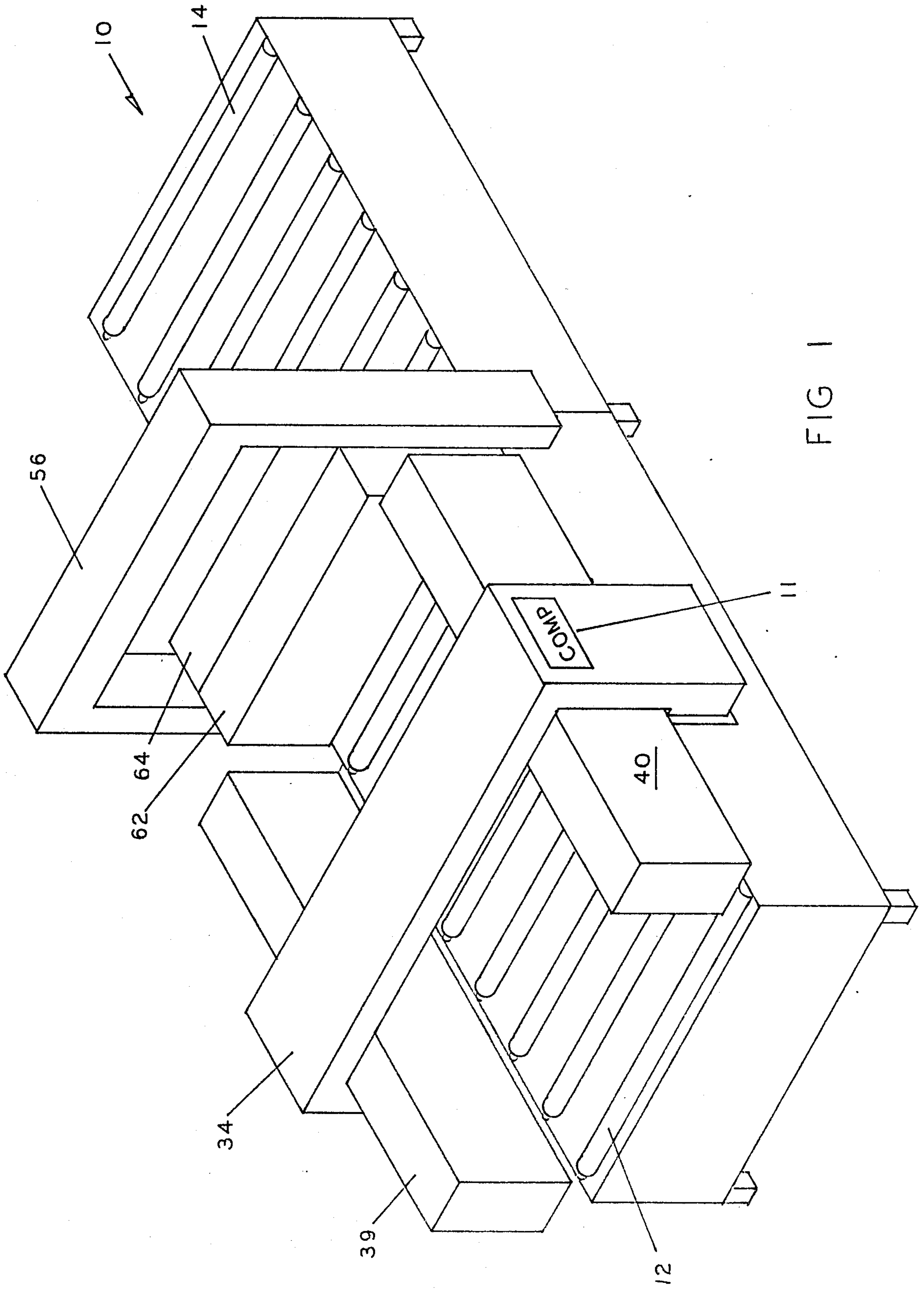
FIG. 1 illustrates a perspective view of an edge curing sealant system.

FIG. 1 illustrates a simplified perspective view of a glass sealant curing system 10 which simultaneously processes a plurality of insulated glass panels for edge sealant curing. A computer 11 controls input conveyor system 12, an output conveyor system 14, and other systems to position insulated glass panels between a stationary infrared heating unit 39 and an opposing positionable infrared heating unit 40, each mounted on a horizontally oriented framework 34. A vertically positionable transverse heater having rearwardly and forwardly facing infrared heating units 62 and 64 moves vertically within a framework 56. A stack of insulated glass with the edges coated with uncured sealant is moved by the input conveyor system 12 until the stack is in the first position where the leading edge and back edges are adjacent to the respective infrared heating units 62 and 39. The input conveyor system 12 is then stopped and the positionable infrared heating unit 40 is moved inwardly towards the third side glass stack. Heat is then applied to cure the sealant edges. When the heating cycle is complete, both infrared heating units 62 and 64 are raised and input conveyor system 12 and output conveyor system 14 are energized to convey the glass stack to a second position on output conveyor system 14. The infrared heating units 62 and 64 are then lowered so that the infrared heating unit 64 can heat and cure the uncured trailing edge of the original glass stack. Concurrent with the movement of the first stack of glass, the second stack of glass may be positioned and heated between the infrared heating units 39, 40 and 62 for maximum use of the curing system.

Figure 2:
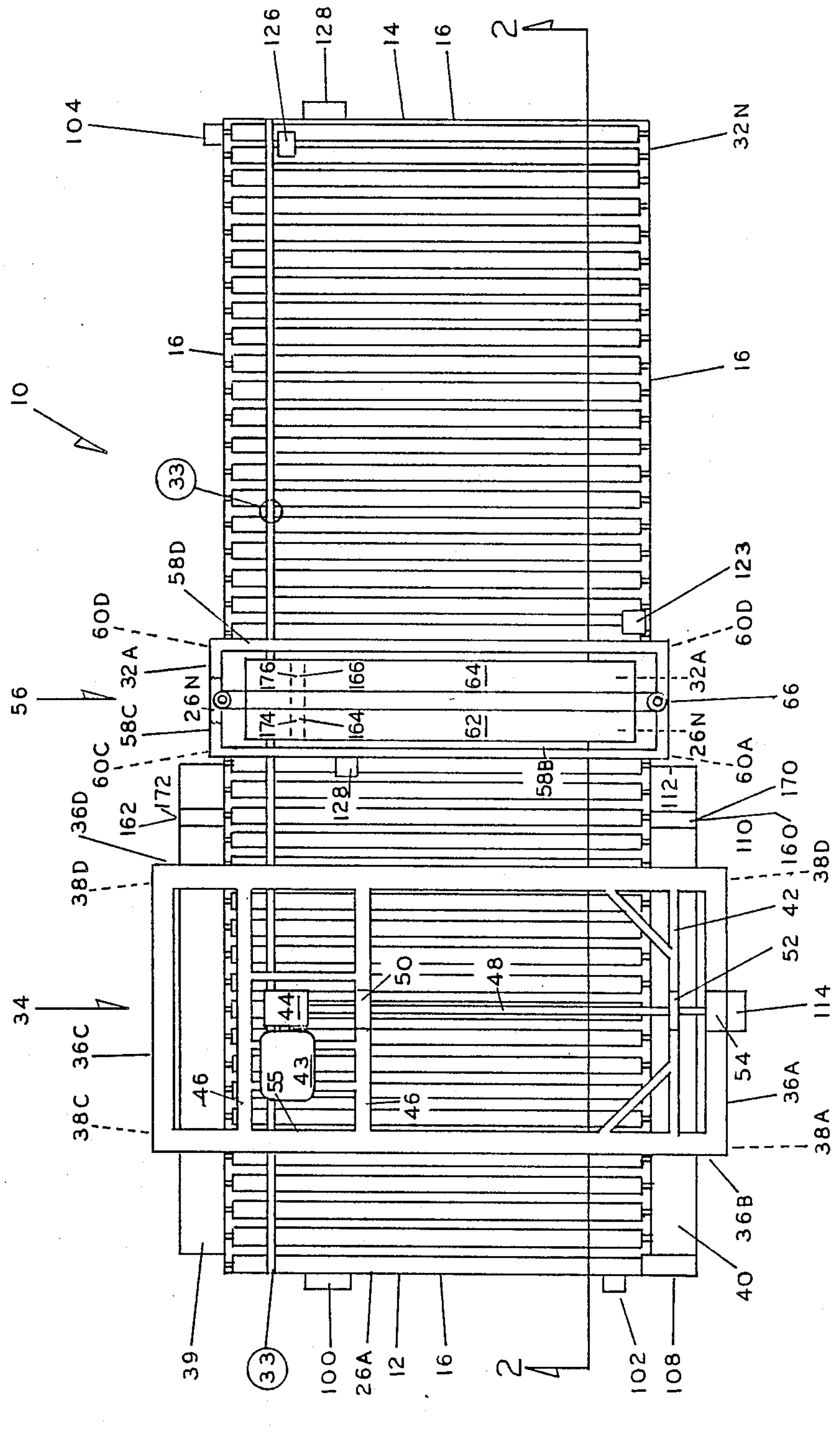
FIG. 2 illustrates a top view.
Figure 3:
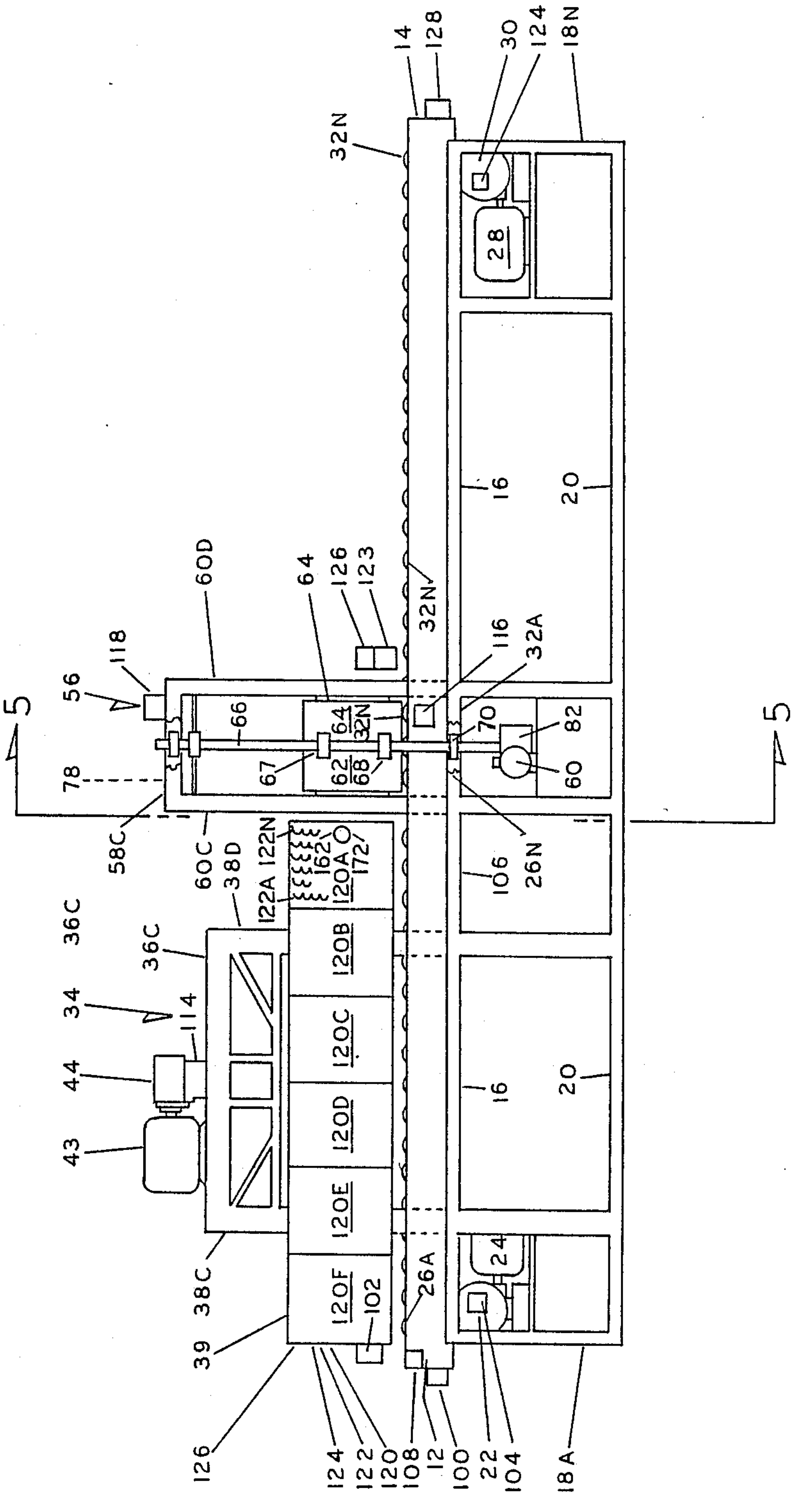
FIG. 3 illustrates a side view.

FIG. 2 illustrates a top view of a glass edge sealant curing system 10 where all numerals correspond to those elements previously described. An input conveyor system 12 and an output conveyor system 14 mount on an upper framework 16, illustrated in FIG. 3. The upper framework 16 is supported by a plurality of vertical members **18*a*–18*n* between the upper framework 16 and a lower framework 20 as illustrated in FIG. 3. A motor 22 and a gear box 24, illustrated in FIGS. 3 and 4, drive the input rollers 26*a*–26*n* of the input conveyor system 12. A motor 28 and a gear box 30, also illustrated in FIG. 3, drive the output rollers 32*a*–32*n* of the output conveyor system 14. The input and output conveyor systems 12 and 14, respectively, operate at the same speed, but can move independently of each other or together to move one or more pieces or stacks of insulated glass through the glass edge sealant curing system 10 for edge sealant curing. An edge guide 33 lies to one side of the input and output conveyor systems 12 and 14. The axes of the rollers of the input and output conveyor systems 12 and 14 are canted 1.5° toward the edge guide 33 to ensure that the glass and stacks are properly positioned against the edge guide 33**.

A horizontal oriented framework 34 includes horizontal frame members **36*a*–36*d* and a plurality of vertical frame members 38*a*–38*d* mounted on the upper and lower frameworks 16 and 20. A stationary, first, infrared heating unit 39 is affixed to the vertical frame members 38*c* and 38*d* at the edge of the input conveyor system 12. A positionable, second, infrared heating unit 40 opposite the stationary infrared heating unit 39 is mounted on a sliding framework 42. The sliding framework 42 is mounted in the horizontally oriented framework 34 which includes horizontal frame members 36*a*–36*d* and vertical frame members 38*a*–38*d*. The positionable, transverse, infrared heating unit 40 is positioned laterally across and above the input conveyor system 12 towards or away from the stationary infrared heating unit 39 to accommodate different sized stacks of uniform sized insulated glass. A horizontal travel motor 43 and a gear box 44 are mounted between horizontal framework members 36*b* and 36*d* on an intermediate framework 46. A smooth surface actuating shaft 48 passes through a frame mounted bearing 50, a threadless linear actuator 52 mounted on the sliding framework 42 and through a bearing 54 mounted on the horizontal frame member 36*a* to move the positionable infrared heating unit 40 mounted on the sliding framework 42 laterally towards or away from the stationary infrared heating unit 39. The sliding framework 42 slides on a dual V-wheel track system 55 within horizontally oriented framework 34. The infrared heating units 39 and 40** have a plurality of modules of vertically oriented heating elements which are activated by computer control according to the length of the insulated glass stack as later described in detail.

Another framework 56, including horizontal frame members **58*a*–58*d* and vertical frame members 60*a*–60*d*, mount on the upper framework 16 and lower framework 20, and is located over the junction of the input conveyor system 12 and the output conveyor system 14. Back-to-back infrared heating units 62 and 64 have vertically oriented heating modules which are activated by computer control according to the width of the insulated glass stack on either input or output conveyor systems 12 and 14. The gearbox 82 of FIG. 3 drives the back-to-back infrared heating units 62 and 64 vertically within the framework 56**.

Figure 6:
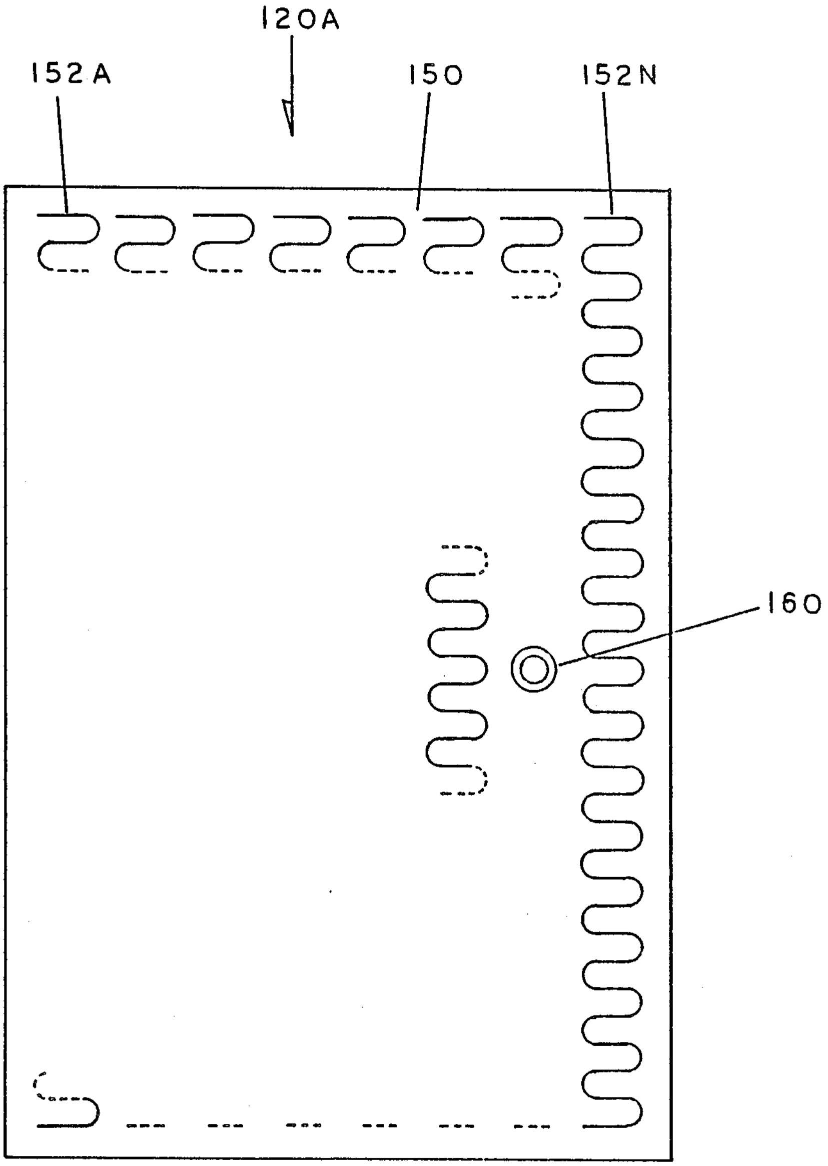
FIG. 6 illustrates a view of a heating module.

FIG. 3 illustrates a partially cutaway side view of the glass edge sealant curing system 10 where all numerals correspond to those elements previously described. Particularly illustrated is the stationary infrared heating unit 39 which is similar to, and typical of, infrared heating units 40, 62 and 64, containing individual infrared heating modules **120*a*–120*f* which are adjacent to each other and each containing a plurality of infrared heating elements 122*a*–122*n* as illustrated in FIG. 6. Any combination of infrared heating modules 120*a*–120*f* may be utilized such as starting at infrared heating module 120*a* and activating a sufficient quantity of heating elements horizontally towards infrared heating module 120*f* to accommodate the length of the stack of insulated glass as determined by a length sensor not illustrated. By way of example and for purposes of illustration, a long insulated glass stack would require a heater having infrared heating modules 120*a*–120*f* in the stationary infrared heating unit 39, and corresponding heating modules in the positionable heating unit 40. A stack of shorter length insulated glass would require only certain of the heater modules, such as 120*a*–120*c* in infrared heating units 39 and 40, be utilized. Similar infrared heating units 40, 52 and 64** have corresponding heating modules, but are not shown for purposes of brevity and clarity. The number of heating elements illustrated is for purpose of demonstration and illustration only and is not to be construed as limiting to the number of heating elements used in each infrared heating unit nor limiting to the scope of the invention. The infrared heating modules are described in detail in FIG. 6.

Figure 4:
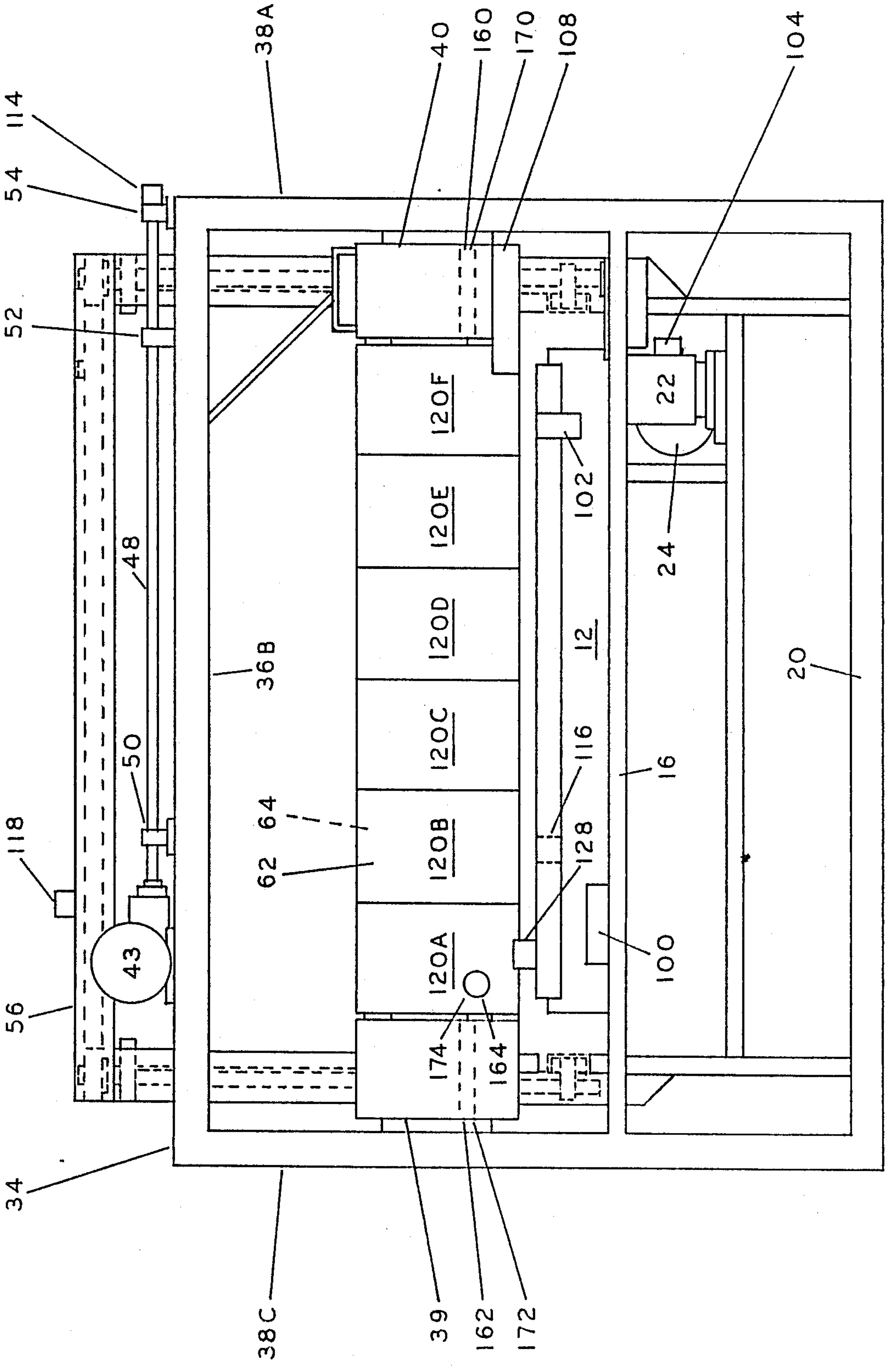
FIG. 4 illustrates an end view.

Sensors mounted at strategic and appropriate points on the frameworks 16, 34 and 56 and other areas, sense the length and width of a stack of insulated glass on the input conveyor system 12. Reference to FIGS. 2, 3, and 4 will be helpful in understanding the location of the following described sensors.

A cart proximity sensor 100 mounted near the outboard end of the input conveyor system 12 determines the presence of a glass feed cart used to transport the stack of insulated glass adjacent to the input conveyor system 12. When the cart presence is detected, a signal is sent to the controller (computer) to activate the input conveyor system 12.

A proximity sensor 102, also located near the outboard edge of the input conveyor system 12, senses the leading edge of the glass stack, and upon sensing the leading edge, signals the computer to monitor an encoder 104 on the input conveyor gear box 24 for the input conveyor system 12. A proximity sensor 106, located at the inboard end of the input conveyor system 12, senses the leading edge of the glass stack as the leading edge comes into proximity to the vertically positionable infrared heating unit 62 and terminates computer monitoring of the encoder 104 count and causes the input conveyor system 12 to cease operation.

An optical sensor 108, having two position reflectors, is located on the outboard end of the positionable infrared heating unit 40 to detect and control the position of the heating unit 40, and position it the correct distance from an insulated glass stack. The optical sensor beam 110 is reflected off of a reflector 112 at the opposing end of the positionable infrared heating unit 40 to sense the length of the insulated glass stack. An encoder 114, at the end of the smooth surface actuating shaft 48, signals the location of the positionable infrared heating unit 40 and develops a width count to determine how many infrared heating modules **120*a*–120*f* should be activated in the infrared heating units 62 and 64**.

Proximity sensors 116 and 118 are located in the framework 56 to sense the full travel of the infrared heating units 62 and 64 to their full down or full up position, respectively.

Another proximity sensor 122 is located at the inboard end of the output conveyor system 14 to sense the insulated glass leading and trailing edges and also develops a length count on an encoder 124 on the gear box 30 of the output conveyor system 14. An optical sensor 126 is located near the output end of the output conveyor system 14 to sense the presence of the glass stack on the output conveyor system 14. A proximity sensor 128 is located at the outboard end of the output conveyor system 14 to sense the presence of an external unloading cart.

FIG. 4 illustrates a left end view of the glass edge sealant system where all numerals correspond to those elements previously described. Shown in particular is the arrangement of the vertically positionable infrared heating unit 62 which has the vertical positionable infrared heating unit 64 facing in the opposite direction on the opposite side.

Figure 5:
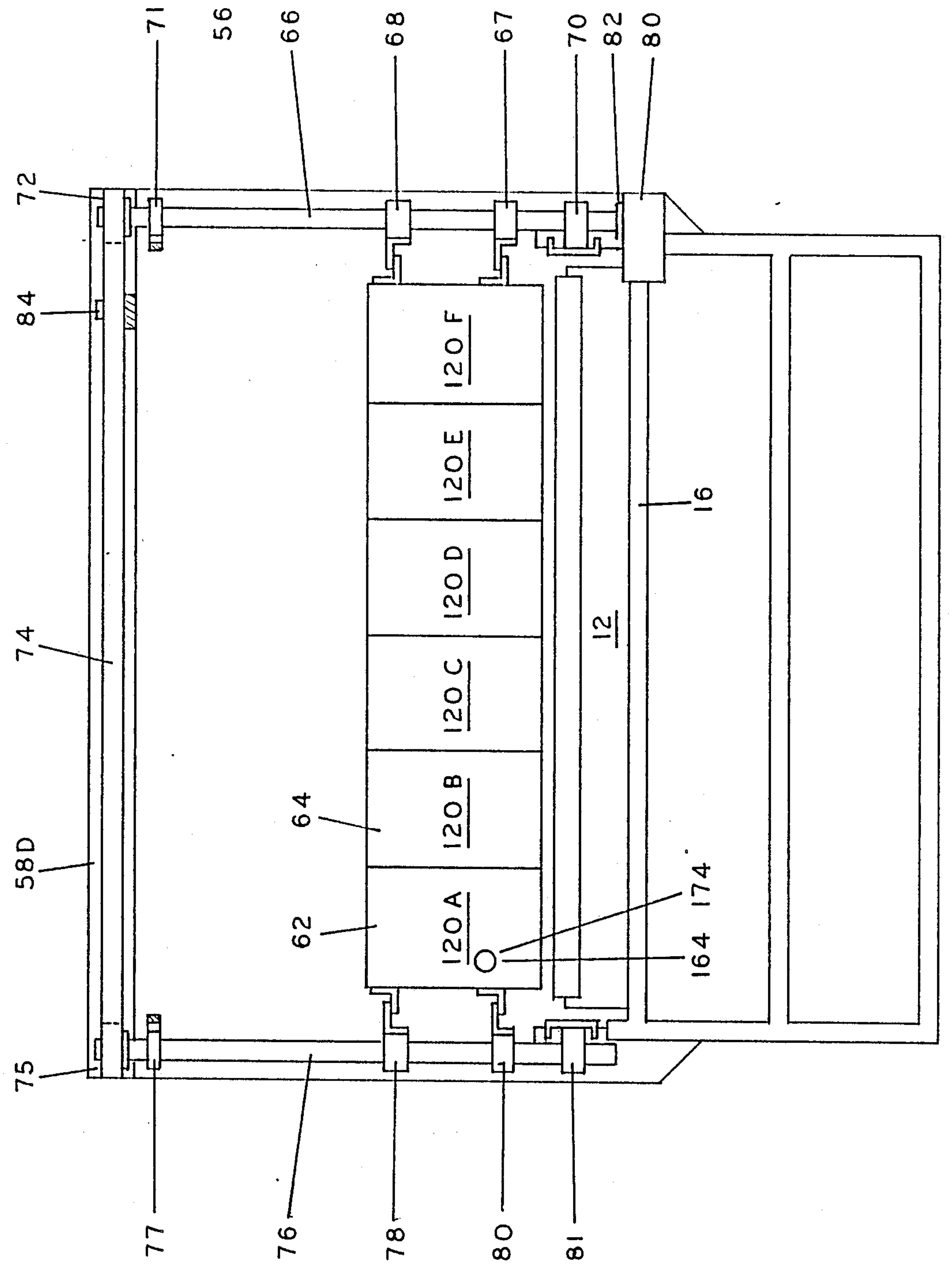
FIG. 5 illustrates a view of the vertical heater unit elevating system taken along aspect line 5—5 of FIG. 3.

FIG. 5 illustrates a view along aspect line 5—5 of FIG. 3 showing an end view of the framework 56 and the vertical positioning members where all numerals correspond to those elements previously described. Two vertical positionable infrared heating units 62 and 64, as also illustrated in FIG. 3, are mounted within the framework 56 and are driven vertically by a threadless actuator drive 80 and gearbox 82 which drives smooth actuator shaft 66, which turns threadless linear actuators 67 and 68 positioned over the smooth surface actuator shaft 66 and located on one side of the infrared heating units 62 and 64. The smooth actuator shaft 66 extends upwardly through a lower bearing 70 located in the upper framework 16 and an upper bearing 71 on framework 56. A sprocket 72 is positioned on the upper portion of the smooth surface actuator shaft 66 to accommodate a timing belt 74 which delivers rotary motion to a similar sprocket 75. Sprocket 75 is affixed to the upper portion of another threadless actuator shaft 76 mounted through a bearing 77 on framework 56. The threadless actuator shaft 76 extends into threadless actuator drives 78 and 80 and a bearing 81 on upper framework 16 and is located on the other end of the infrared heating units 62 and 64 opposing threadless linear actuators 67 and 68, and threadless actuator drives 78 and 80 are simultaneously driven by the threadless actuator drive 80, gear box 82 and smooth actuator shaft 66 and threadless linear actuator 76 to vertically position the entire vertical positionable infrared heating units 62 and 64. An idler pulley 84 on horizontal frame member **58*d* positions against the timing belt 74**.

The use of the threadless linear actuators 67, 68, 78 and 80, which convert rotary motion into linear motion, is particularly important in that thrust capacity is varied by adjusting the linear actuators so that loads exceeding a specified thrust setting cause bearings in the linear actuators to slip on the smooth surface actuator shaft 66 and threadless actuator shaft 76. This causes the advancement of the linear actuators to cease even though the actuator shafts continue to turn. In case of a computer or peripheral component system failure where a stack of glass would inadvertently be positioned beneath the descending vertically positionable heater units 62 and 64, the linear actuators would slip at a preset level, thus stopping the descent of the vertically positionable heating units 62 and 64 and minimizing the chance of glass breakage beneath the vertically positionable heating units 62 and 64. This is an improvement over a system which would use conventional ball screw and threaded shaft arrangements.

FIG. 6 illustrates an individual infrared heating module, such as **120*a* of FIG. 3, where all numerals correspond to those elements previously described. The module includes a refractory board 150, a plurality of infrared heating elements 152*a*–152*n* mounted on a refractory board 150**.

The infrared heating elements **152*a*–152*n*, also illustrated in FIG. 6, are best described as single source emitters with a power output of 20 watts per square inch. The infrared heating elements 152*a*–152*n* are fabricated from 0.025″×0.075″ flat nichrome alloy resistance wire. The resistance wire is formed in a serpentine manner with horizontal spans of 1″ and separations of 0.045″. The formed serpentine element has a width of 1″ and length of 18″ to 144″ depending on the requirement for vertical or horizontal application. The infrared heating elements 152*a*–152*n* are placed in a vertical orientation on 2″ centers and are mounted on the face of refractory board 150** to eliminate back losses. The generated infrared wave lengths will be from the very low side of far infrared (9.8 microns) through intermediate infrared and could go as high as a very low side of near infrared (2.6 microns). Under normal operation the ideal range for the cure of edge sealant for insulated glass will be in the range from 6 to 8 microns.

Each infrared heating module **120*a*–120*f* includes a plurality of heating elements mounted on a refractory board 150. In FIG. 2, special thermopile ports 160, 162, 164 and 166 are placed in the refractory panels and infrared heating units 39, 40, 62 and 64 to allow internal lens focused thermopiles 170, 172, 174 and 176** to look through the infrared heating elements and measure the surface temperature of the sealant the infrared energy is curing. The operation of the thermopiles is explained later in detail.

Temperature control is critical when infrared energy is used to accelerate the cure of urethane and other types of insulated glass edge sealants. The prior art falls short of the critical temperature control required by using multiple source infrared emitters and proportional simulated temperature control. The control of temperature for the glass edge sealant system 10 includes proportional, integral and derivative control. The outstanding feature of the design is the fact that the actual temperature of the sealant is registered in a real time manner without having a sensor in actual contact with the sealant. Optical temperature sensing is affected by the use of thermopiles 170–176. Non contact optical temperature sensing is achieved by the use of a lens focused thermopiles 170, 172, 174 and 176 in each infrared heating module. Each thermopile 170, 172, 174 and 176 is positioned to look through thermopile ports 160–166 in a refractory board of the infrared heating units 39, 40, 62 and 64. The thermopiles generate a current in much the same manner as a solarcell. The hotter the thermopiles gets, the more current it will generate. Because the current the thermopile will generate is so low it is directly connected to a miniature 4 stage amplifier which is electronically temperature compensated. The thermopile and the amplifier are both contained in the body of the probe. The amplified thermopile output is OVDC to 3VDC, and has a response time of 3 to 50 milliseconds.

The thermopile signal is handled according to block diagram in FIG. 8, to achieve a fully proportional, integral and derivative electronic temperature control system.

MODE OF OPERATION

Figure 7:
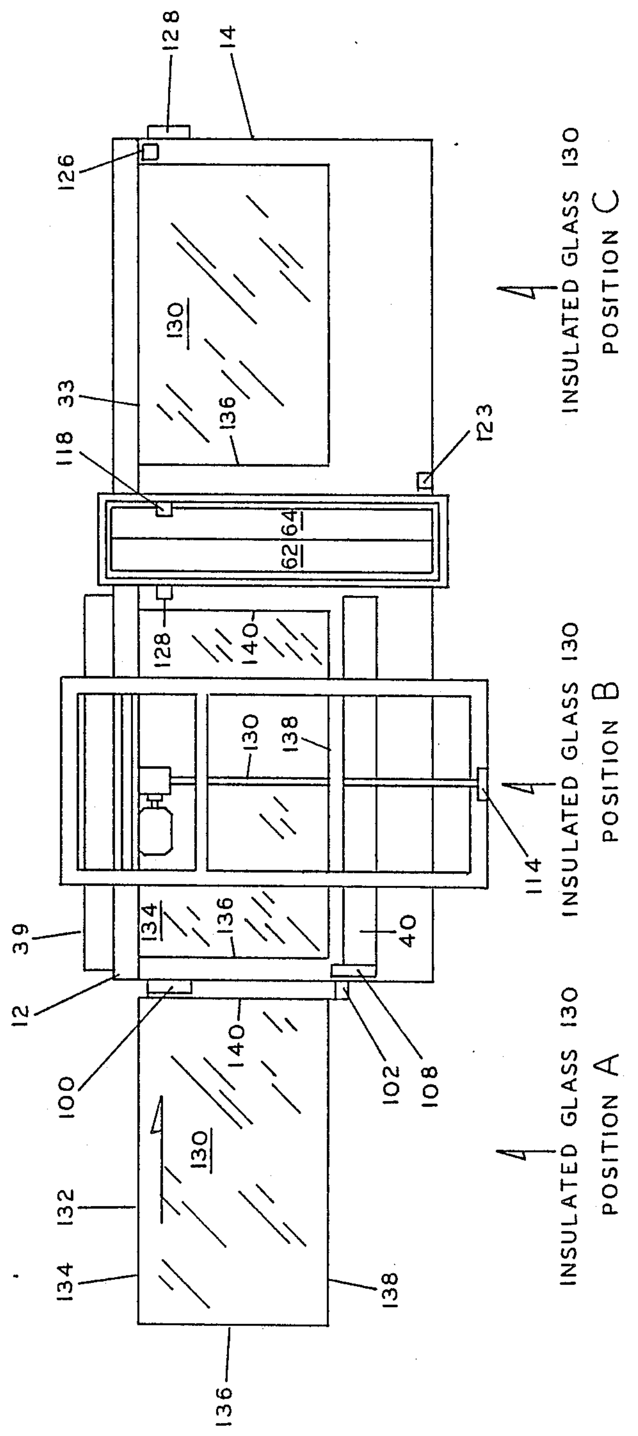
FIG. 7 illustrates a view with glass panes on the system and in operation; and, FIG. 8 (FIGS. 8A and 8B) illustrates a flow chart of the electromechanical system operation.

FIG. 7 illustrates the mode of operation incorporating a simplified illustrative example where all numerals correspond to those elements previously described. Stacks of insulated glass 130 with an edge sealant 132 placed across the aligned edges 134, 136, 138 and 140 are delivered by carts or an external conveyor to a position adjacent to the input conveyor system. The presence and proper alignment of the glass stack 132 is sensed by the proximity sensor 100 positioned at the end of the input conveyor system 12, and the input conveyor system 12 is started by computer controlled circuits. At this point the stack of glass 130 is positioned manually by an operator until it engages the input rollers **26*a*–26*n* of the input conveyor system 12 whereupon no further operator intervention is required. The presence of the stack is sensed by proximity sensor 102 which actuates encoder 104 on the gear box 24. The stack 130, aligned to the edge guide 33 during transfer from the external cart or conveyor and kept in alignment by roller canting, advances on the input conveyor system 12 to position first B and a point that is an optimum preset distance from and along the edge guide 33 from the infrared heating unit 39 to heating edge 134. Proximity sensor 106 is activated when the leading glass stack edge is in position at the proper distance from the infrared heating unit 62 and the sensor output signal is sent to stop the conveyor encoder 104 count. The length of the glass has now been measured and is stored for reference by the computer for proper subsequent positioning on the output conveyor system 14. The infrared heating unit 62 now can be used to heat stack edge 140. At this time the horizontally positionable infrared heating unit 40 mounted in the sliding framework 42, which is actuated by the horizontal travel motor 43 and controlled by computer 11 advances to an optimum position adjacent to the glass stack 130 as sensed by optical sensor 108, as also illustrated in FIG. 4, to heat the edge 138 of stack 130. Encoder 114, at the end of the smooth surface actuating shaft 48, measures the length of travel of the infrared heating unit 40 to register the proper number of infrared heating modules 120*a*–120*f* in the vertical positionable infrared heating unit 62 to be activated. The same measure of travel is used to determine the number of infrared heating modules actuated in at infrared heating unit 64 for the curing of edge 140 after the glass stack 130 passes onto the output conveyor system 14**.

The duration of the cure process is controlled by the computer 11. When thermopile sensors 170, 172 and 174 detect the appropriate temperatures and the appropriate cure time has passed, the system is ready to accept the next stack of insulated glass units. When the stack 130 is cured, the infrared heating unit 40 returns to its original position as illustrated in FIGS. 1 and 2 and the infrared heating units 62 and 64 are elevated by the threadless actuator drive 80 to allow clearance of the stack 130, which has been cured on sides 134, 136 and 140, to pass beneath the infrared heating units 62 and 64. The input and output conveyor systems 12 and 14 are started simultaneously to move the stack 130 to a second position C, passing by proximity sensor 123 which senses the leading and trailing edges of the glass stack, until trailing edge 136 reaches an optimum point from the infrared heating unit 64 as determined by proximity sensor 123. The output conveyor system 14 is stopped by the computer and the vertically positionable infrared heating units 62 and 64 descend into position so that infrared heating unit 62 can heat the trailing edge 136 of stack 130. Proximity sensors 116 and 118 determine travel limits of the infrared heating units 62 and 64.

At this point the input conveyor system 12 operates to position a second stack of insulated glass, which may be of a different size than the first stack 130, to be processed in a manner similar to that used to process the first stack. If the proximity sensor 128 on the output conveyor system 14 indicates the absence of a cart to accept the glass stack 130 from position C, the glass edge sealant curing system will not accept a new stack of insulated glass for the input conveyor system 12. During the heating operation of the glass edge sealant curing system only the elements required for heating a particular dimensioned stack of insulated glass are used as determined by the appropriate sensors resulting in electrical savings and increases efficiency.

By virtue of the computer control and mechanical design, random insulated glass stack sized from 10"×10" to 91"×60" up to 18" high can be cured on a continuous basis. In other words, different sizes may be loaded every 4 to 8 minutes with no sacrifice in production rate or quality of cure. The cure cycle times are software adjustable as desired depending upon the edge sealants ability to take heat and degree of catalyzation. alyzation.

Temperature control is fully proportional, integral and derivative. Ramp up to the desired actual surface temperature is fully software adjustable. This provides for minimum cycle time and allows the temperature rise curve to be custom fit to the chemistry of the edge sealant to prevent blistering. The intensity of the special infrared generators is computer controlled by a user definable algorithm allowing adjustability from 0 to 180 KW. Ample IR heating power assures quick rise to temperature for maximum dwell at cure temperature. Optical temperature sensors register the actual surface temperature on the sealant. The computer 11 uses this information to adjust the intensity of the infrared heating units 39, 40, 62 and 64. Temperature set points are key pad adjustable from 0° to 160° F. The sophisticated control and operation of the glass edge sealant curing system allow it to accommodate manual operation and can be included in a fully automated stack handling operation.

The computer 11 manipulates the system from a mechanical standpoint based on the sensor derived information. An automatic energy saving mode shuts down sections of the infrared heating units not required depending on the size of the insulated glass stack. The intelligence of the glass edge sealant curing system allows it to be easily integrated, as a component, with other "flexible automation systems" for flat line insulated glass. By virtue of the computer and the electronics the production rates and cure profiles are completely user definable limited only by the degree of cure desired and the downstream production capacity to assemble the insulated glass units into frames.

Figure 8A:
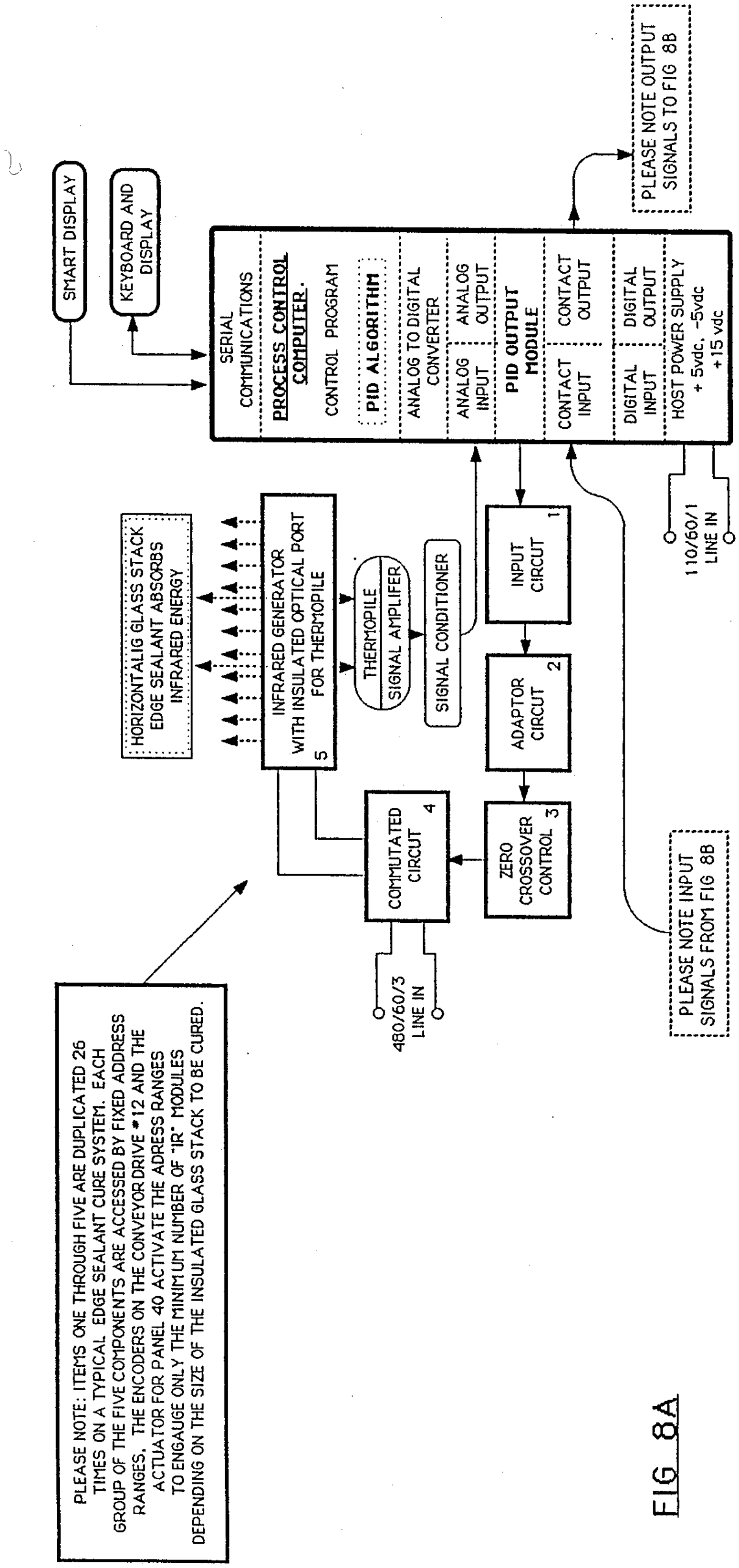
Figure 8B:
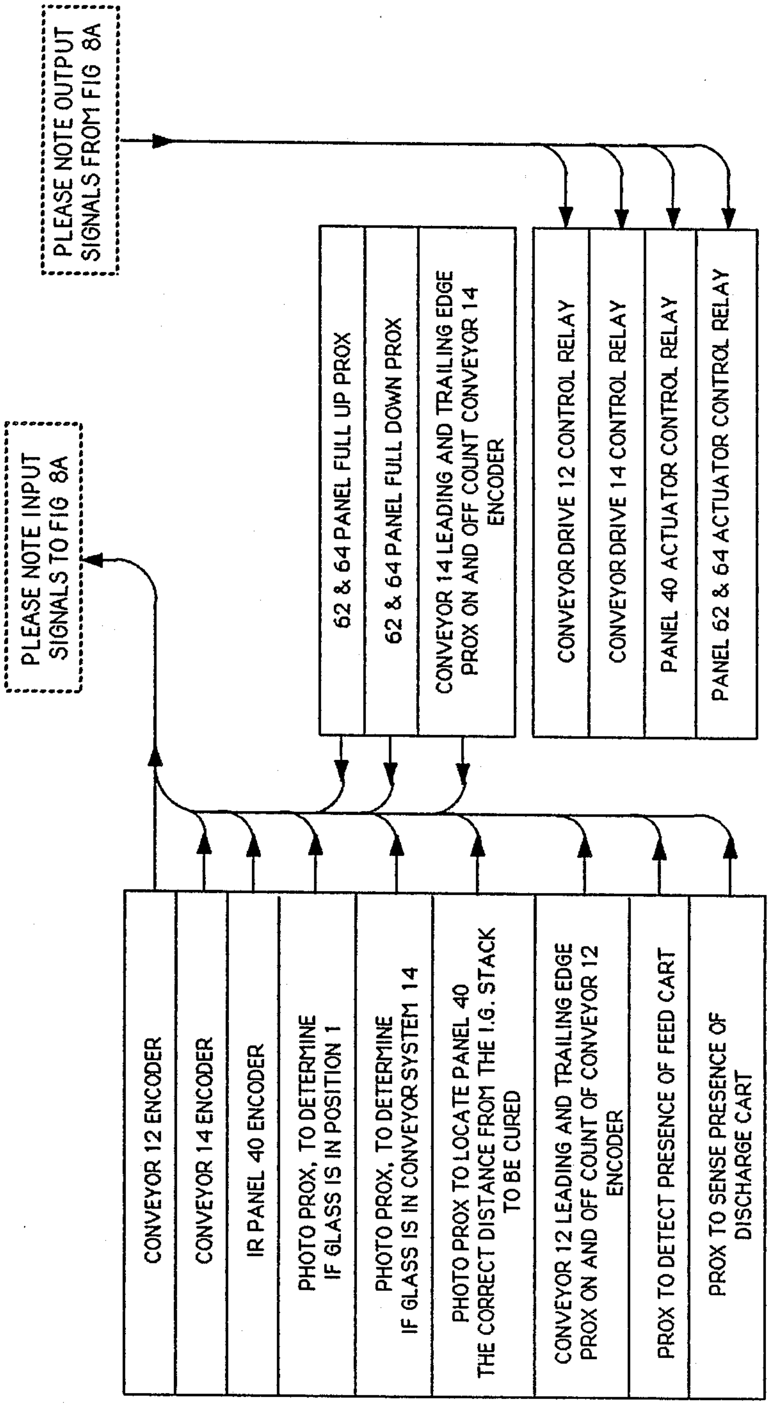

FIG. 8 (FIGS. 8A and 8B) illustrates a block diagram of the controller of the system 10. The infrared heating units are controlled by the process control computer which could be a personal computer or a like apparatus, readily available in the marketplace. An appropriate algorithm is provided for the particular sealant chemistry with respect to heating temperature and times. The computer controls the switching of the power to the infrared heating units. Encoders, sensors and relays also connect to the computer. Closed-loop feedback is provided for full closed-loop proportional, derivative and integral control with real time processing.

Various modifications can be made to the present invention without departing from the apparent scope thereof.

We claim:

1. Process for curing sealant about edges of a stack of insulated glass units comprising the steps of:

a. conveying a stack of insulated glass units to a first location;
b. surrounding three sides of said stack of insulated glass units including the front end, with heating units;
c. heating said three sides with a heater energy;
d. conveying said stack of insulated glass units to a second location down stream of said first location;
e. Surrounding said rear end with a heater;
f. heating said rear end; and,
g. conveying said stack away from said second location.

2. A process for curing sealant about edges of an insulated glass unit comprising the steps of:

a. moving an insulated glass unit having a leading edge, a trailing edge and front and back side edges to a first location and placing a back side edge adjacent a first heating unit;
b. positioning a transverse heating unit in proximity to said leading edge and a second heating unit in proximity to said front side edge;
c. heating the three edges to cure said sealant;
d. removing said transverse heater from proximity to said leading edge;
e. moving said insulated glass unit to a second position;
f. positioning said transverse heating unit in proximity to said trailing edge of said insulated glass unit;
g. heating said trailing edge to cure said sealant; and,
h. conveying said insulated glass unit away from said second location.

3. A process according to claim 1 further including the simultaneous execution of steps a and e on second and first insulated glass units.

4. A process according to claim 2 further including the simultaneous execution of steps c and g on second and first insulated glass units.

5. System for curing of edge sealant comprising:

a. a straight flow-through conveyor for conveying a stack of a plurality of insulated glass units from an entrance location, to a first location, to a second location, to an exit location;
b. a heater means along one side of said conveyor at said first location, a moveable in and out heater means parallel to said side heater means, and a raisable and lowerable heater means having front and back heating units perpendicular to said path of travel; and,
c. continuous power means connected to said heater means for energizing said heater means.

6. System for curing of edge sealant comprising:

a. a straight flow-through conveyor for sequentially conveying a stack of insulated glass units from an entrance location, a first position, a second position, and an exit location;
b. a first heater means positioned at a back side of said conveyor at said first position;
c. a second heater means positioned at a front side of said conveyor at said first position, and adaptable to be moved toward and away from said conveyor;
d. a third heater means having a leading edge heating unit and a trailing edge heating means unit, both extending across said conveyor and adapted to be raised and lowered to heat leading and trailing edges;
e. controller means for operating said conveyor to place a first stack of insulated glass units at said first position, then controlling said second heater to position it adjacent a front edge of said stack and controlling said third heater means to position it adjacent a leading edge of said stack; and,
f. said controller means further operating to connect said first, second and third heaters to a variable intensity of a continuous source of power to heat said edge sealant and cure same.

7. System of claim 6 including a. at least one thermopile in one of said heater assemblies; and,
b. said thermopile connected to said control means for controlling said heater means.

8. System of claim 6 including means for storing an algorithm for curing a specific sealant.

9. System of claim 6 including edge sealant temperature sensing means connected to said controller means, said heater means for developing a signal response to the temperature of said edge sealant for use by said controller means.

10. System of claim 6 wherein said heater means are long-wave, high-intensity, infrared, single source emitters.

* * * * *